Sept. 3, 1963    H. L. HARDY ETAL    3,102,429
ROTATING MACHINE DYNAMIC BALANCING APPARATUS
Filed Feb. 18, 1958    8 Sheets-Sheet 2
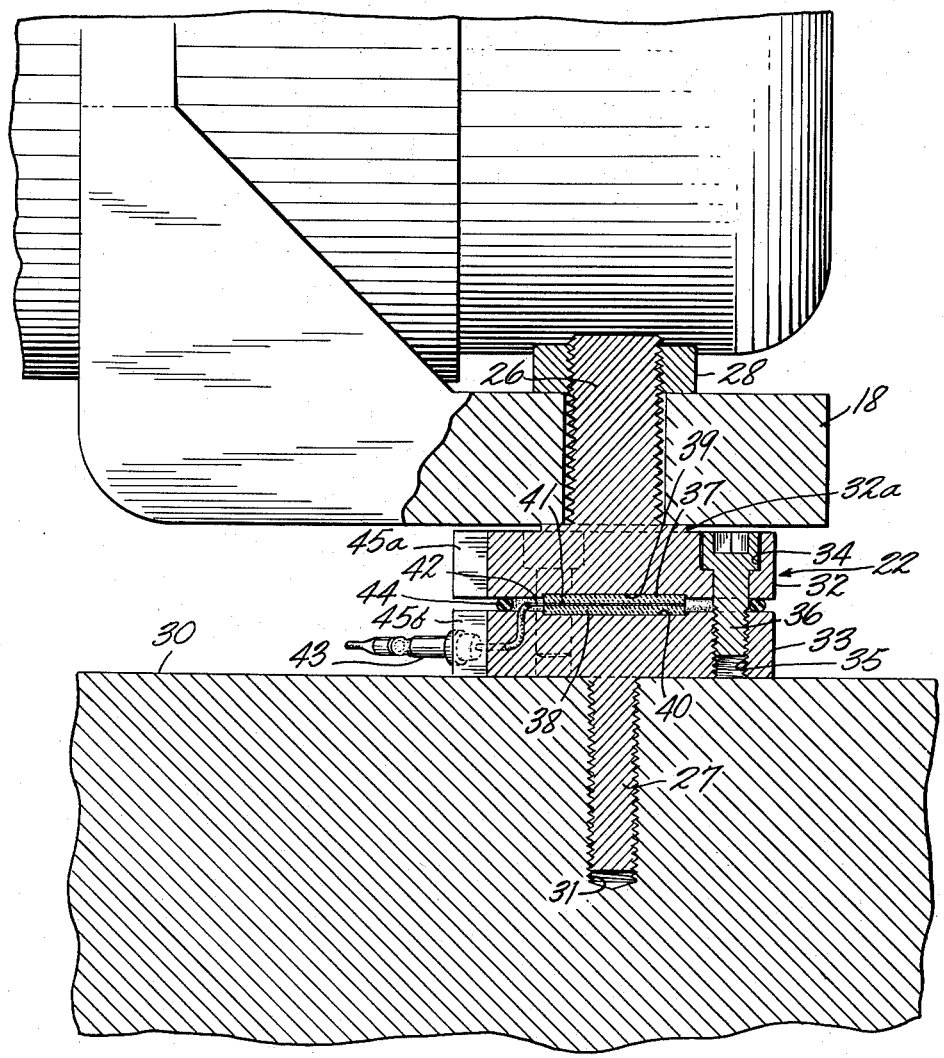
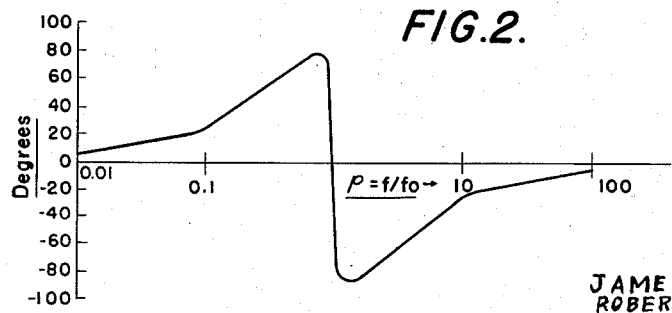
FIG. 6.
INVENTORS.
HERBERT L. HARDY
JAMES VINCENT HARRINGTON
ROBERT D. COLLIER
AGNES C. SUMMERS
BY Brumbaugh, Free, Graves + Donohue
Their ATTORNEYS.

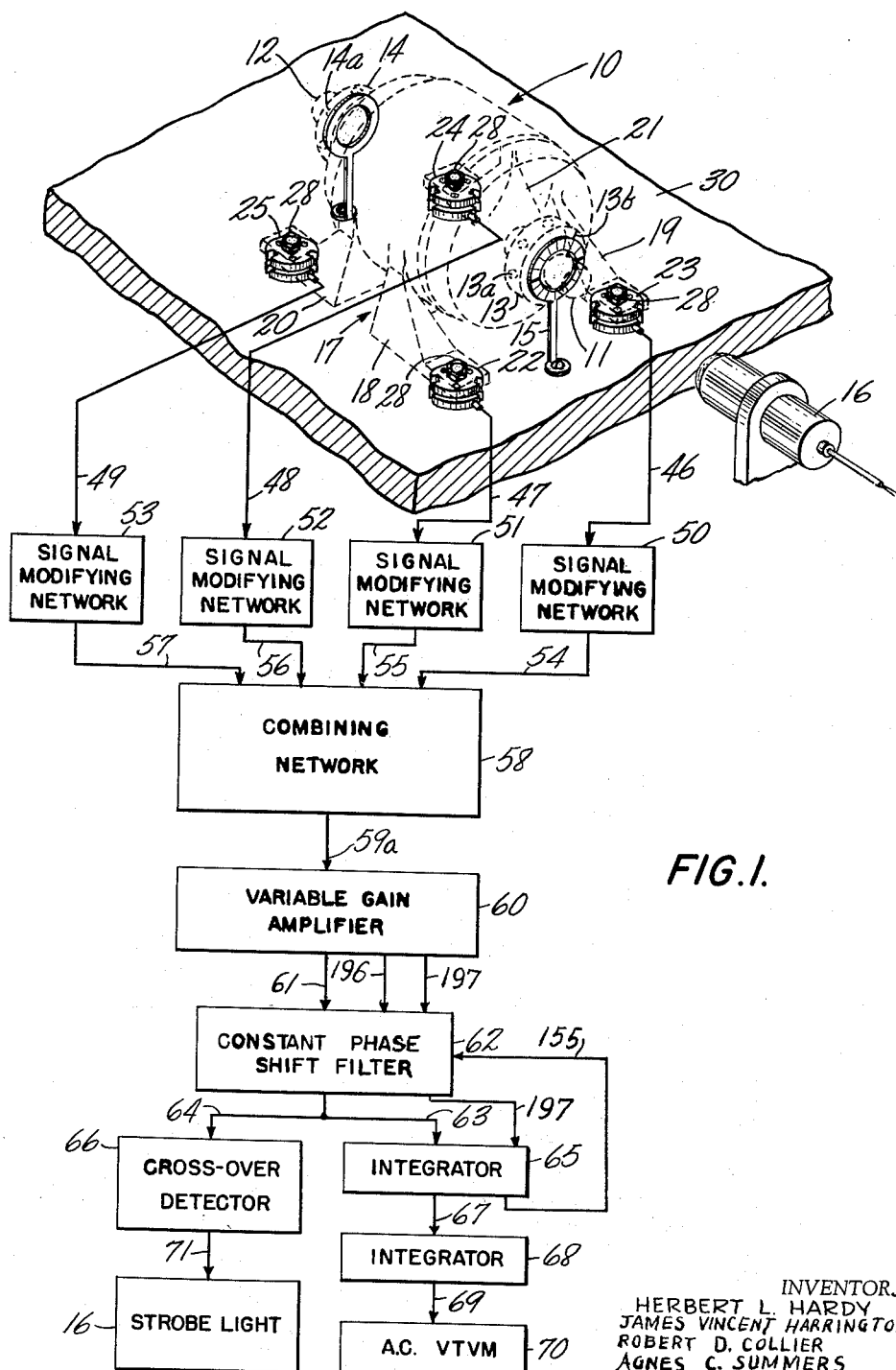

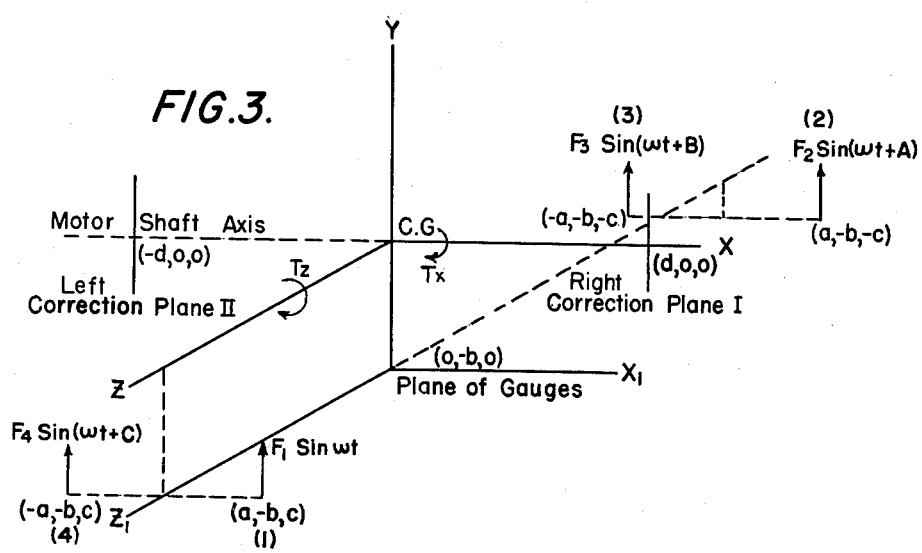
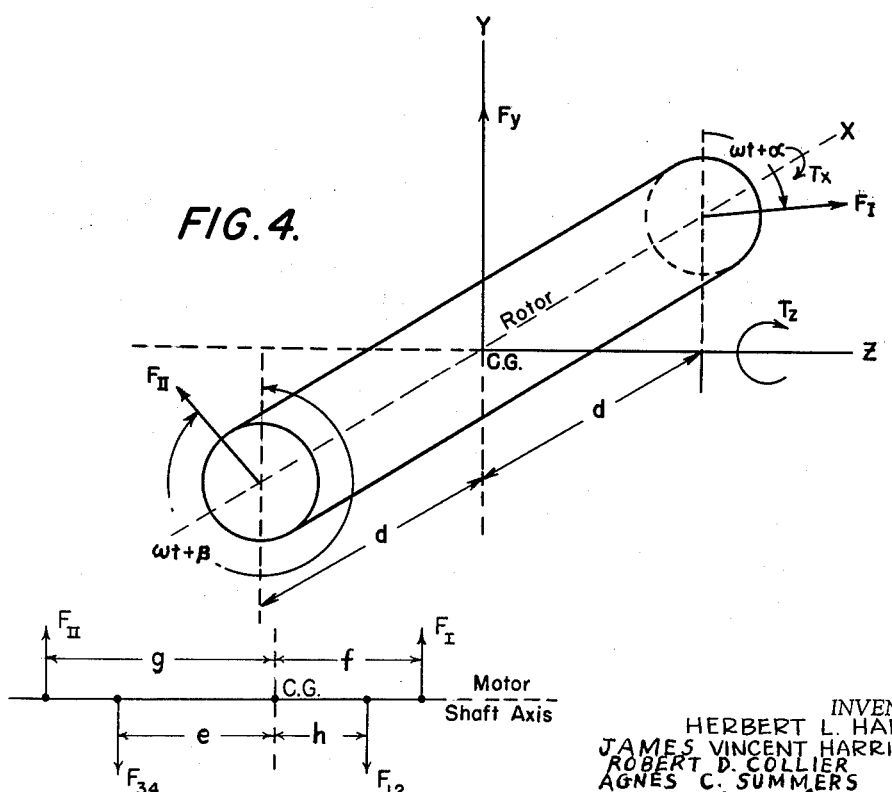

Sept. 3, 1963 H. L. HARDY ETAL 3,102,429
ROTATING MACHINE DYNAMIC BALANCING APPARATUS
Filed Feb. 18, 1958 8 Sheets-Sheet 4

INVENTORS
HERBERT L. HARDY
JAMES VINCENT HARRINGTON
ROBERT D. COLLIER
AGNES C. SUMMERS
BY Brumbaugh, Free, Graves & Donohue
Their ATTORNEYS.

INVENTORS
HERBERT L. HARDY
JAMES VINCENT HARRINGTON
ROBERT D. COLLIER
AGNES C. SUMMERS

BY
Their ATTORNEYS.

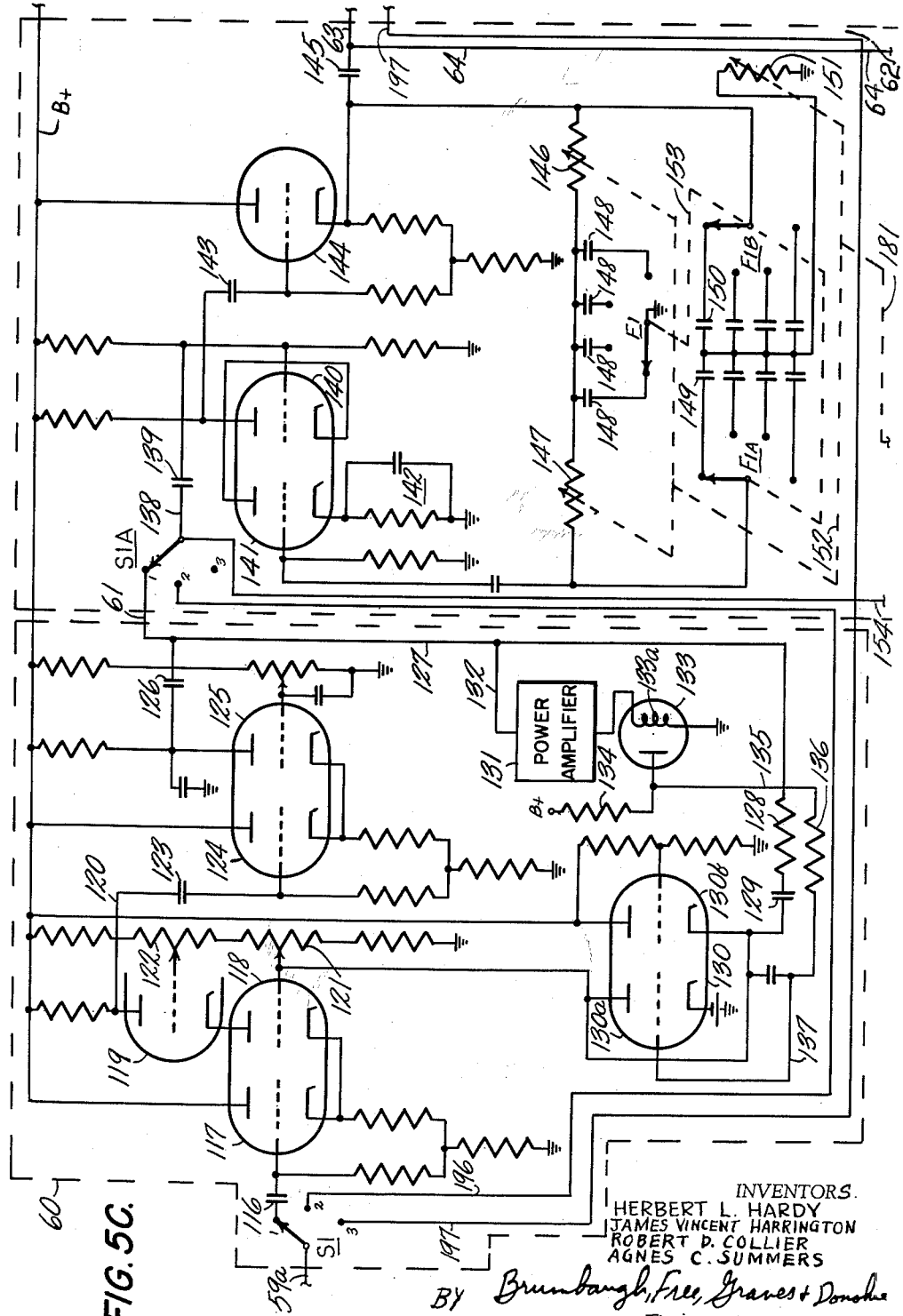

INVENTORS.
HERBERT L. HARDY
JAMES VINCENT HARRINGTON
ROBERT D. COLLIER
AGNES C. SUMMERS
BY Brumbaugh, Free, Graves + Donohue
Their ATTORNEYS.

United States Patent Office 3,102,429
Patented Sept. 3, 1963

3,102,429
ROTATING MACHINE DYNAMIC BALANCING APPARATUS
Herbert L. Hardy, Waterford, James Vincent Harrington, Mystic, Robert D. Collier, Old Mystic, and Agnes C. Summers, Niantic, Conn., assignors to General Dynamics Corporation, New York, N.Y., a corporation of Delaware
Filed Feb. 18, 1958, Ser. No. 715,912
18 Claims. (Cl. 73—462)

This invention relates to balancing of rotating machinery and, more particularly, to dynamic balancing of assembled normally operating machines.

It is desirable to balance rotating machinery for several reasons including increased service through reduction of bearing stresses, low noise levels, and generally efficient operation. In the past most machines have been balanced by individually testing separate rotating components prior to assembly of the machine unit. Known procedures to effect such balancing are numerous, some of those methods utilizing a single pressure responsive element to provide signals indicative of unbalance, for example, of a rotor supported in a particular jig, while others utilize a plurality of such pressure responsive elements in fairly complex arrangements in attempts to improve dynamic balancing of particular rotating elements.

The difficulties with all of the known arrangements for balancing rotating machinery stem chiefly from the fact that even if an electric motor rotor, for example, is perfectly balanced when rotated in a particular jig, there is no assurance that the same rotor will not vibrate excessively when assembled in bearings within a stator. Thus, in every motor there may not only be unbalance in mass distribution of the rotor but also asymmetry in the bearings and/or the electromagnetic field causing rotation of the rotor.

In some instances rotating machinery must be balanced to an extremely high standard to minimize vibration noises resulting from unbalance effects. For example, rotating machinery in submarines must be designed to generate minimum noise to prevent sonar detection. In those circumstances, it is desirable to balance rotating machines under actual operating conditions or, at the least, under conditions simulating actual operating conditions.

The present invention provides for dynamic balancing of fully assembled rotating machines in all environments. To achieve such balancing, the machine under test is supported by four pressure responsive force gauges responding solely to dynamic vertical forces, generated during operation of the machine, to provide signals representative of such forces. Circuits responsive to the unbalance force signals may be adjusted in accordance with the location of the force gauges relative to the location of a pair of balancing or correction planes on the rotor of the machine. After adjusting those circuits, it is only necessary to operate the machine under test to determine directly the amount of amplitude unbalance forces and the angular position of those forces at each balancing or correction plane. Suitable addition or subtraction of weight from discs in the two balance planes may then be effected to balance the machine to a degree unobtainable heretofore.

Another feature of the invention resides in the generation of signals in response to the force gauge outputs that are a function of the total static unbalance forces in the rotating machine, and the generation of further signals in response to such outputs that are a function of the torques about axes perpendicular and parallel to the rotor axis.

These and further advantages of the invention will be more readily understood when the following description is read in connection with the accompanying drawings in which:

FIGURE 1 illustrates a rotating machine undergoing balancing operations through the use of balancing apparatus shown schematically in block form in accordance with the present invention;

FIGURE 2 is a sectional view of one of the force gauges illustrated in FIGURE 1 showing details of its construction;

FIGURES 3, 4 and 4A are diagrams of forces involved in balancing a rotating machine;

Figure 5A:
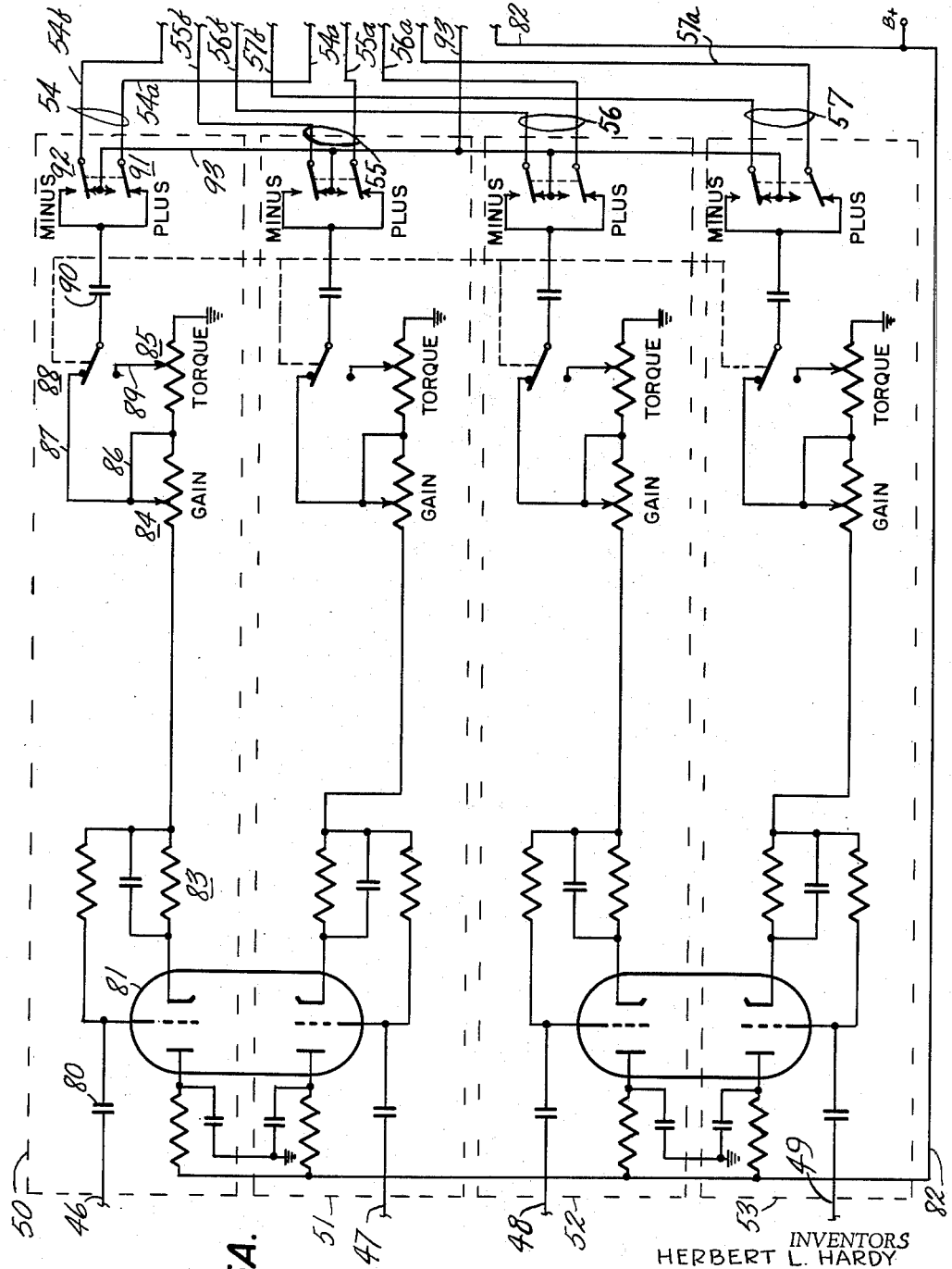

FIGURES 5A to 5E taken together illustrate a schematic circuit diagram of a typical dynamic balancer in accordance with the present invention; and FIGURE 6 is a curve illustrating phase characteristics of a filter found in FIGURES 1 and 5C.

Referring to an illustrative embodiment of the invention in greater detail with particular reference to FIGURE 1, an electric motor 10 incorporates a pair of shafts 11 and 12 extending from its rotor. Balancing discs 13 and 14 carried by the shafts 11 and 12 are located in left and right correction or balancing planes, respectively, and provided with a plurality of drilled holes 13a and 14a which may receive weights in any desired manner such as by force fit, threading or the like. If desired, portions of the balancing discs may be drilled out in order to remove a particular mass from suitable portions thereof.

At each end of the motor 10 an indicator 15, fastened to the base 30, incorporates a circular scale, marked in degrees, juxtaposed with the discs 13 and 14. On the discs, as shown on the disc 13, is inscribed a radial indexing line 13b. Positioned to illuminate the disc 13 and indicator scale 15 intermittently is a strobe light 16, energized in a manner detailed hereinafter, and shown, in the interests of clarity, somewhat removed from a preferred location adjacent to the disc.

A supporting frame 17 for the motor 10 includes pairs of legs 18, 19 and 20, 21 at each end of the machine. Force gauges 22 to 25, each incorporating upper and lower studs 26 and 27, are fastened to the feet 18 to 21 by means of nuts 28, and to a base or foundation 30 by means of threaded openings 31 (FIGURE 2) formed therein. With the foregoing arrangement, it is apparent that the entire weight of the motor 10 is supported by the force gauges 22 to 25.

In most instances, the base or foundation 30 should be heavy with respect to the weight of the motor 10 or other rotating machine; for example, twenty times the weight of the machine, so that it may be assumed to be operating against an infinite impedance. Such conditions permit the comparison of one type of machine against another and the standardization of test results. Thus, information obtained from various tests at different locations will have a particular meaning, when compared, if they have been conducted with a machine operating against an infinite impedance.

On the other hand, it may sometimes be advantageous to operate the machine against a specific impedance if it is desired to find the vibration output of a machine working into a base or foundation having particular characteristics.

To insure accuracy of the balancing apparatus when used to balance rotating machinery operating at various speeds, it is necessary to provide output signals from the force gauges 22 to 25 varying linearly as a function of the applied dynamic forces over a wide frequency range. Referring now to FIGURE 2, the force gauge 22, greatly enlarged and shown in section, is formed of a pair of circular plates 32 and 33 from which extend the studs 26 and 27. A boss 32a may be formed on the plate 32. Each of the plates 32 and 33 are provided with three aligned holes 34 and 35 angularly spaced 120 degrees, the latter being threaded to receive bolts 36 extending through the plate 32.

A pair of piezoelectric elements 37 and 38 in the form of circular barium titanate crystals are received in shallow countersunk openings 39 and 40, respectively, of a depth less than the thickness of the crystals 37 and 38. A silver disc electrode 41 between the crystals 37 and 38 is joined by a conductor 42 to the center contact of a jack 43 located on the plate 33, the outer contact being fastened to the plates. Finally, a rubber O-ring 44 is positioned between the upper and lower plates 32 and 33 to protect the crystal elements from atmospheric contamination. Aligned spanner wrench slots 45a and 45b are also provided in the plates 32 and 33.

In assemblying the force gauge 22, a preload is applied to the ceramic elements 37 and 38 by alternately tightening the three bolts 36 with a torque wrench until a predetermined torque value on each bolt is obtained. The preloading of the unit 22 to the proper value (a minimum value of 3400 pounds per square inch with the above construction has been found desirable) is essential if the gauge is to provide a linear response between dynamic load applied and voltage output over a wide frequency range, as discussed above.

It will be apparent that the force gauge 22 may be mounted in the threaded hole 31 in the base 30 by means of the stud 27, the aligned spanner wrench slots 45a and 45b facilitating this operation without shear loading of the piezoelectric elements 37 and 38. The foot 18 of the machine supporting frame 17 may then be fastened to the upper plate 32 by means of the nut 28 on the stud 26. The force gauges as described are responsive only to vertical forces, as will be evident from the nature of their construction, which precludes other than reciprocating movement between the plates 32 and 33. Obviously other force gauges generating signals representative of applied vertical forces may also be used in the inventive balancing apparatus.

Returning to FIGURE 1, output signals from the force gauges 22 to 25 are coupled through lines 46 to 49, respectively, to four signal modifying networks 50 to 53, respectively. Adjustable elements provided in the signal modifying networks, discussed in greater detail in connection with FIGURE 5A, equalize the response characteristics of the four force gauges 22 to 25. Further adjustable elements in the signal modifying networks are set in accordance with the distances between the force gauges and the right and left balancing or correction planes, such distances determining the moments about which the forces generated by the motor 10 act. In another application of the invention, those elements may be adjusted in accordance with the distances of the force gauges from the center of gravity of the motor rotor. Finally, switches in the networks direct the modified signals in a predetermined manner to one of two paths in each of the lines 54 to 57 leading to a combining network which functions to add and/or subtract the input signals, depending on the switch settings in the networks 50 to 53, to provide composite output signals on the line 59a. The various adjustments that may be made in the above-described networks will be described in greater detail hereinafter.

After amplification to a selected amplitude in a variable gain amplifier 60, if the amplifier is not bypassed to provide output signals on either of the lines 196 or 197, the composite signals are coupled by the line 61 to a constant phase shift filter 62 set to pass the fundamental unbalance frequency of the motor 10. Since not only the amplitude of the unbalance forces must be determined but also the angular location of such forces, the phase shift of all of the elements used in the inventive apparatus must be held within a narrow range and preferably essentially constant over a wide frequency range. One particular constant phase shift filter that may be used in the present invention is illustrated in FIGURES 5C and 5E and described hereinafter.

The output signals from the filter 62 are coupled through lines 63 and 64 to an integrator 65 and a cross-over detector 66, respectively. Alternatively, the filter 62 is bypassed to provide signals on line 197 to the integrator 65. The integrated signals are transmitted through a line 155 to the filter 62 and through another line 67 to a second integrator 68 whose output is coupled through a line 69 for measurement by an A.C. vacuum tube voltmeter 70, which indicates the unbalance of the rotating machine.

The signals received by the cross-over detector 66, varying at the fundamental frequency of rotation of the motor 10, are used to control through a line 71 flashing of the strobe light 16 which effectively stops the motion of the disc 13 and indicates, by the angle between the inscribed line 13b and a horizontal indicia on the indicator 15, the angular position of the unbalance forces in the right correction plane on the rotor of the machine 10. Elements may then be adjusted in the networks 50 to 53 and the unbalance forces and their angular position in the left correction plane determined in the same manner.

To understand the operation of the inventive balancing apparatus in detail, it will be helpful to examine the forces found in a rotating machine. With reference to FIGURE 3, the X axis represents the motor shaft axis and the Y axis a vertical through the center of gravity of the rotor of the motor, the Z axis being at right angles thereto through the center of gravity. Below the X—Z plane, a distance $-b$ is found a plane $X_1$—$Z_1$ in which are disposed the force gauges 22 to 25.

Assuming that $f_1$, $f_2$, $f_3$ and $f_4$ represent the instantaneous vertical constraining forces of the force gauges 22 to 25 respectively:

(1) $\qquad f_1+f_2+f_3+f_4=F_y$ wherein $F_y$ is the sum of the vertical constraining forces. Since $f_1=F_1 \sin \omega t$, $f_2=F_2 \sin (\omega t+A)$, $f_3=F_3 \sin (\omega t+B)$, and $f_4=F_4 \sin (\omega t+C)$, then:

(2) $\quad F_y=F_1 \sin \omega t+F_2 \sin (\omega t+A)$
$\qquad\qquad +F_3 \sin (\omega t+B)+F_4 \sin (\omega t+C)$ where $\omega$ equals the angular frequency in radians per second, $t$ equals elapsed time from a reference time, and A, B and C are constant angles depending on the positions of the force gauges 22 to 25.

In addition to the above forces, there is a torque $T_z$ about the Z axis which may be expressed (3) $\quad T_z=aF_1 \sin \omega t+aF_2 \sin (\omega t+A)$
$\qquad\qquad -aF_3 \sin (\omega t+B)-aF_4 \sin (\omega t+C)$ where $a$ equals the distance along the X or motor shaft axis from the center of gravity of the rotor.

There is also a torque $T_x$ about the X axis which may be expressed:

(4) $\quad T_x=cF_1 \sin \omega t+cF_4 \sin (\omega t+C)$
$\qquad\qquad -cF_2 \sin (\omega t+A)-cF_3 \sin (\omega t+B)$ where $c$ equals the distance along the Z axis from the center of gravity of the rotor.

Referring next to FIGURE 4, which illustrates resultant forces $F_I$ and $F_{II}$ acting in right and left correction planes I and II perpendicular to the axis of the rotor, it is apparent that the following relationships apply:

(5) $\qquad F_y=F_I \cos (\omega t+\alpha)+F_{II} \cos (\omega t+\beta)$ (6) $\qquad T_z=dF_I \cos (\omega t+\alpha)-dF_{II} \cos (\omega t+\beta)$ wherein $\omega t+\alpha$ equals the angle in radians between the vertical and the force $F_I$, $\omega t+\beta$ equals the angle in radians between $F_{II}$ and the vertical, and $d$ is the distance from the center of gravity to the correction planes along the motor shaft. Multiplying Equation 5 by $d$:

(7) $\quad dF_y = dF_I \cos(\omega t + \alpha) + dF_{II} \cos(\omega t + \beta)$ Adding the Equations 6 and 7:

(8) $\quad\quad\quad dF_y + T_z = 2dF_I \cos(\omega t + \alpha)$ and:

(9) $\quad \dfrac{dF_y + T_z}{2d} = F_I \cos(\omega t + \alpha)$

If Equation 6 is subtracted from Equation 7 and the same steps are followed:

(10) $\quad \dfrac{dF_y - T_z}{2d} = F_{II} \cos(\omega t + \beta)$

From the foregoing, it is apparent that:

(11) $\quad dF_y + T_z = d[F_1 \sin \omega t + F_2 \sin(\omega t + A) + F_3 \sin(\omega t + B) + F_4 \sin(\omega t + C)] + a[F_1 \sin \omega t + F_2 \sin(\omega t + A) - F_3 \sin(\omega t + B) - F_4 \sin(\omega t + C)]$ Substituting:

(12)
$$F_I \cos(\omega t + \alpha) = \left(\dfrac{d+a}{2d}\right)[F_1 \sin \omega t + F_2 \sin(\omega t + A)]$$
$$+ \left(\dfrac{d-a}{2d}\right)[F_3 \sin(\omega t + B) + F_4 \sin(\omega t + C)]$$

and:

(13)
$$F_{II} \cos(\omega t + \beta) = \left(\dfrac{d+a}{2d}\right)[F_3 \sin(\omega t + B)$$
$$+ F_4 \sin(\omega t + C)] + \left(\dfrac{d-a}{2d}\right)[F_1 \sin \omega t + F_2 \sin(\omega t + A)]$$

From the foregoing equations, it will be apparent that multiplying the signals from the force gauges 22 and 23 by the factor $$\dfrac{d+a}{2d}$$

in the networks 50 and 51, multiplying the signals from the force gauges 24 and 25 by the factor $$\dfrac{d-a}{2d}$$

in the modifying networks 52 and 53, adding the modified signals in the combining network 58, and rejecting all except the fundamental frequency signals in the filter 62, will provide signals on the lines 63 and 64 representative of $F_I \cos(\omega t + \alpha)$.

In like manner, if the networks 50 and 51 multiply the signals from the force gauges 22 and 23 by $$\dfrac{d-a}{2d}$$

and the networks 52 and 53 multiply the outputs of the force gauges 24 and 25 by $$\dfrac{d+a}{2d}$$

the resulting signals on the lines 63 and 64 will be representative of $F_{II} \cos(\omega t + \beta)$.

The above equations have been developed for the case wherein the rotating machine is symmetrical in respect to the distances $a$ and $d$. For the general case the following development uses a much abbreviated notation, in which $F_I = F_I \cos(\omega t + \alpha)$, $F_{II} = F_{II} \cos(\omega t + \beta)$, $F_{12} = F_1 \sin \omega t + F_2 \sin(\omega t + A)$ and $$F_{34} = F_3 \sin(\omega t + B) + F_4 \sin(\omega t + C)$$

Referring to FIGURE 4A:

(14) $\quad -(g-e)F_{34} - (g+h)F_{12} + F_I(f+g) = 0$

(15) $\quad F_I = \left(\dfrac{g+h}{f+g}\right)F_{12} + \left(\dfrac{g-e}{f+g}\right)F_{34}$

(16) $\quad -(f-h)F_{12} + F_{II}(f+g) - (e+f)F_{34} = 0$

(17) $\quad F_{II} = \left(\dfrac{e+f}{f+g}\right)F_{34} + \left(\dfrac{f-h}{f+g}\right)F_{12}$ The multiplying factors used in Equations 12 and 13 correspond to those used in generalized Equations 15 and 17 as follows:

(a) $\quad\quad\quad \dfrac{d+a}{2d}$ in Equation 12 corresponds to $$\dfrac{g+h}{f+g}$$

in Equation 15.

(b) $\quad\quad\quad \dfrac{d-a}{2d}$ in Equation 12 corresponds to $$\dfrac{g-e}{f+g}$$

in Equation 15.

(c) $\quad\quad\quad \dfrac{d+a}{2d}$ in Equation 13 corresponds to $$\dfrac{e+f}{f+g}$$

in Equation 17.

(d) $\quad\quad\quad \dfrac{d-a}{2d}$ in Equation 13 corresponds to $$\dfrac{f-h}{f+g}$$

in Equation 17.

From the foregoing, it is apparent that the present system is independent of the location of the balancing planes and force gauges with respect to the center of gravity of the machine, the only required dimensions being:

$f+g$—Distance between balancing planes.

$g+h$ and $e+f$—Distance from balancing plane to gauges at opposite ends of the rotor shaft.

$g-e$ and $f-h$—Distance from balancing planes to gauges at the same end of the rotor shaft.

Should any of the dimension differences of the equations prove to be negative, and this will happen if one of the correction planes is inside the plane of the force gauges; i.e., wherein the term $$\dfrac{f-h}{f+gh}$$

is greater than $f$, the appropriate switches 92 may be placed in their minus position (see FIGURE 5A) for subtraction in the combining network 58.

It should be noted that theoretically there are forces acting along the X and Y axes resulting in torques due to the displacement of the $X_1$—$Z_1$ plane from the X—Z plane. However, from a consideration of the forces causing unbalance, it is apparent that the torque about the axis $Z_1$ will be generated substantially only by $T_z$ and therefore essentially equal thereto. Accordingly, a term in Equation 3 representing a torque generated by a force along the X axis has been omitted in the interests of clarity. For similar reasons a term in Equation 4 representing a torque generated by a force along the Z axis has been omitted. In other words, the omitted torques at the fundamental frequency must be generated by forces other than those due to unbalance, and in all motors tested the effects of those forces and torques have been found negligible.

The force in a plane around an axis at a distance $r$ from the axis may be stated as follows:

(18) $$F = Mr\omega^2$$

Since F equals $F_I \cos(\omega t + \alpha)$ or $F_{II} \cos(\omega t + \beta)$, and $r$ is known, the signals on the line 63 representative of $Mr\omega^2$ are integrated twice in the integrators 65 and 68 to multiply them by $1/\omega^2$. This eliminates the term $\omega$ and provides an indication on the suitably calibrated meter 70 of $Mr$, the unbalance moment, in ounce-inches or gram-centimeters, for example. This unbalance moment is in one or the other of the correction planes, depending on whether the circuits are set to provide $F_I \cos(\omega t + \alpha)$ or $F_{II} \cos(\omega t + \beta)$.

The angles $\alpha$ and $\beta$ may be determined by having the cross-over detector flash the strobe light 16 each time the signal $F_I \cos(\omega t + \alpha)$ or $F_{II} \cos(\omega t + \beta)$ passes through zero in one direction. Thus, the zero cross-over point indicates that the force in the plane of measurement under consideration (the right or left correction plane) is momentarily in the horizontal direction. Accordingly, the angular distance between the reference indicia 13b on the disc 13 (when the right plane is considered) and the horizontal may be measured by means of the scale on the indicator 15 as it is illuminated by the strobe light, to determine the point where weight must be added or taken away to balance the rotor.

To determine accurately the angular position of unbalance forces in the correction planes, the phase shift characteristics of the circuits between the force gauges 22 to 25 and the strobe light 16 must be substantially constant over the frequency range for which the balancing apparatus is designed to operate, and each of the individual circuits has been constructed to provide such constant phase shift. It is particularly difficult to maintain a constant phase shift through a filter circuit, such as the circuit 62, and the manner in which that result is achieved has been described in detail hereinafter.

Referring to FIGURE 5A, which illustrates exemplary circuits that may function as the signal modifying networks 50 to 53, each of the four identical channels incorporating the networks have been enclosed by broken lines. Since the circuit components are the same in each, only the channel incorporating the network 50 will be described.

Signals generated by the force gauge 23 are transmitted on the line 46 through a coupling capacitor 80 to the grid of a triode 81 connected as a cathode follower. As will be evident from the drawing, B+ voltage to operate the circuits is applied through a conductor 82 to the cathode follower. A normal biasing circuit 83 is provided in the cathode circuit of the triode 81, output signals appearing across potentiometers 84 and 85, the latter being grounded. The movable contact of the potentiometer 84 is joined by a jumper 86 to the upper end of the potentiometer 85, as well as being connected by a conductor 87 to one contact of a switch 88 movable to receive signals either from the potentiometer 84 or from the potentiometer 85 through another conductor 89. Signals from the switch 88 pass through a blocking capacitor 90 to a further switching array formed of a pair of switches 91 and 92 selectively connecting the output signals to conductors 54a, 55a, 56a, and 57a, and 54b, 55b, 56b and 57b incorporated in the lines 54, 55, 56 and 57 of FIGURE 1. The coupling capacitor 90 has been disposed to work into the high input impedance of the succeeding amplifiers (FIGURE 5B) in order to provide uniform response over a wide frequency range. At their other positions, the switches 91 and 92 are joined to a conductor 93 maintained at a potential by a voltage divider including resistor 94 and biasing network 95 (FIGURE 5B) to prevent the amplification of stray signals.

Figure 5B:
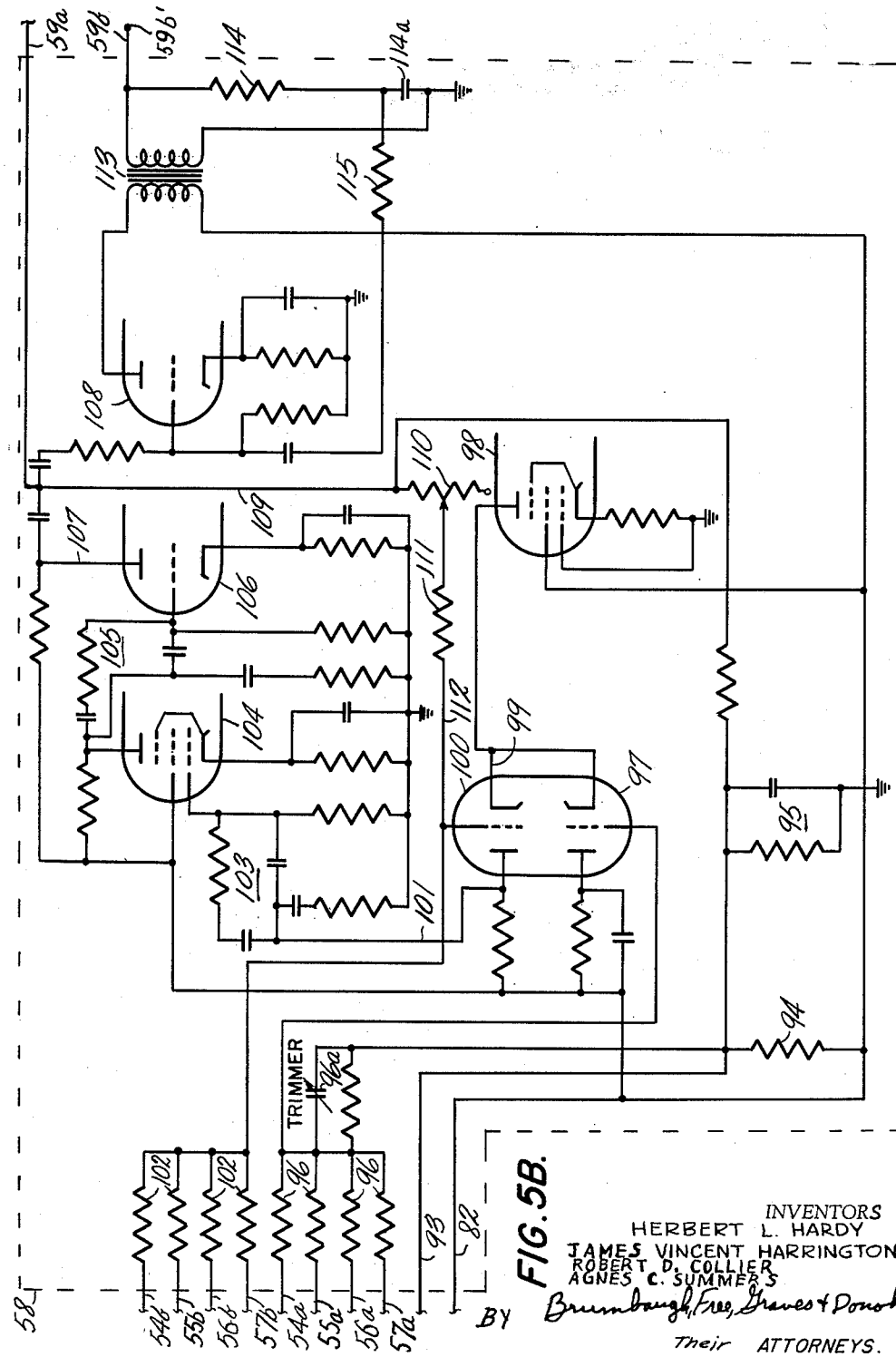
Figure 5D:
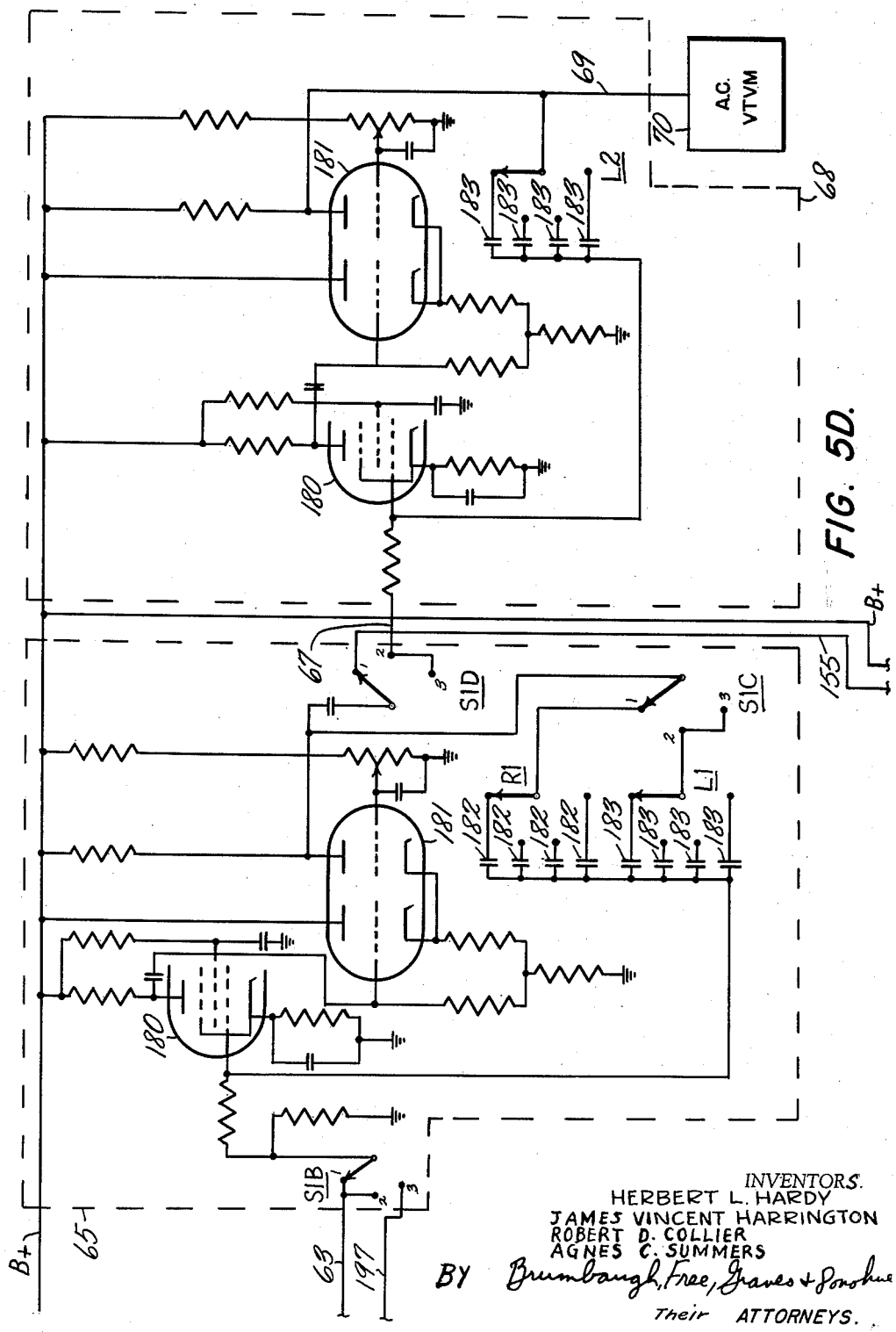
Figure 5E:
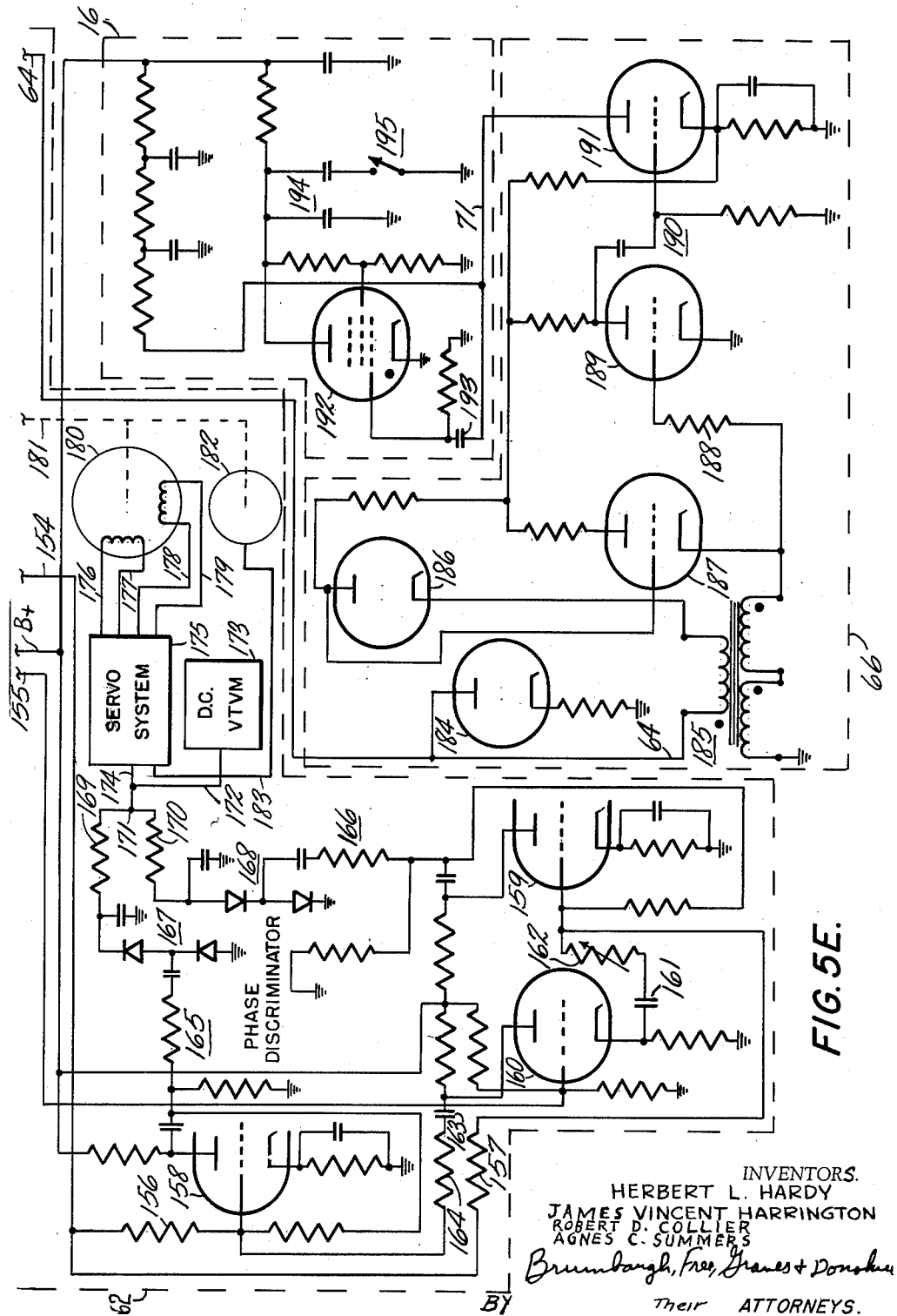

Examining FIGURE 5B, signals on the four lines 54a, 55a, 56a and 57a, with the switches 91 positioned as shown, are applied through identical resistors 96 to the grid of a triode 97 connected to function as a cathode follower. A trimmer 96a facilitates phase shift compensation. A pentode 98 in the cathode circuit functions to provide an active constant current source with the advantages of a high impedance to ground. The triode 97 is cathode coupled through a conductor 99 to a triode amplifier 100 furnishing signals on an output conductor 101. It is apparent that the signals supplied on the conductors 54a, 55a, 56a and 57a are added and coupled to the conductor 101 without phase inversion.

Signals on the conductors 54b, 55b, 56b and 57b, with the switches 92 in their upper position, are added and coupled by identical resistors 102 to the grid of the triode amplifier 100 which inverts and effectively subtracts those signals from the signals found on the lines 54a, 55a, 56a and 57a.

The signals appearing on the conductor 101 are coupled through a network 103 to the grid of a conventionally connected pentode 104 having its output signals in turn transmitted through a coupling network 105 to the grid of a further triode 106. The output of the triode 106 on a conductor 107 is fed through suitable coupling elements to an output conductor 59a and to the grid of an output triode 108, a portion of such output also being degeneratively fed back to the grid of the triode 100 through a conductor 109, a potentiometer 110, a resistor 111 and a conductor 112. The feedback potentiometer 110 may be adjusted to provide amplitude balance between the positive (lines 54a, 55a, 56a and 57a) and negative (lines 54b, 55b, 56b and 57b) channels.

It will be apparent from the foregoing that the amplifiers 97, 100, 104 and 106, together with the feedback resistors 110 and 111, comprise an operational summing amplifier with a differential input stage for the signals found on the lines 54a, 55a, 56a and 57a and 54b, 55b, 56b and 57b.

The final output signals are passed through a transformer 113 to an output line 59b which terminates in an output terminal 59b'. A portion of the output voltage, provided by a network including a resistor 114 and a capacitor 114a, is fed back through a resistor 115 to the triode 108 to stabilize the output stage over a wide frequency range. The output line 59a bypasses the transformer 113 to eliminate phase shift effects contributed by that element.

Referring next to FIGURE 5C which illustrates one form of variable gain amplifier 60, signals on the line 59a are transmitted through a three position selector switch S1 in position 1, the selector switch incorporating further ganged sections S1A, S1B, S1C and S1D, through a capacitor 116 to the grid of a cathode follower connected triode 117. A pair of triodes 118 and 119 comprise a cascade amplifier cathode coupled to the cathode follower 117, the resulting amplified signals being transmitted on a conductor 120. Potentiometers 121 and 122 may be adjusted to vary the bias on the triodes 118 and 119, respectively.

A capacitor 123 couples signals from the line 120 through a further cathode follower 124 and another triode amplifier 125 cathode coupled thereto which transmits output signals through a capacitor 126 to the line 61. To provide for a relatively constant output over a wide amplitude range of varying input signals, a conductor 127 connected to the output degeneratively feeds back signals through a resistor 128 and a capacitor 129 to the grid of the triode 118.

A power amplifier 131 also responds to output signals from the variable gain amplifier 60 through the line 127 and a conductor 132. The power amplifier 131 functions to heat a filament cathode 133a in a conventional saturated diode 133 having its resistance determined by the filament temperature. Therefore, as the output signals of the variable gain amplifier 60 increase in amplitude, the diode 133 will decrease in resistance, thereby causing a greater voltage drop across a resistor 134 connected to the plate of the diode. Such negative going voltage is applied through a conductor 135, a resistor 136, and a conductor 137 to the grid of a dual triode 130 having left and right-hand sections 130a and 130b.

The cathode of the triode 130a is positively biased and acts to present a variable resistance path to ground for the feedback voltages coupled to the grid of the triode 118. The triode 130b functions as a clamp to limit the excursions of the plate of the triode 130a to insure operation of that tube in a linear region.

In operation, if the output of the variable gain amplifier 60 increases, the negative D.-C. voltage supplied to the grid of the tube 130a causes that tube to appear as a higher resistance to the degenerative feedback signals transmitted to the tube 118 and, accordingly, the heavier feedback reduces the overall gain of the amplifier. On the other hand, if the amplitude of the output signals decreases, the grid of the tube 130a becomes less negative so that more of the degenerative feedback signals are shunted to ground and the gain of the amplifier 60 increases.

Signals on the line 61 from the variable gain amplifier 60 are coupled through the switch S1A in position 1 to the constant phase shift filter 62, which incorporates several component circuits shown in FIGURES 5C and 5E. Signals from the switch are supplied through a conductor 138 and a coupling capacitor 139 to the grid of a triode amplifier 140, having a further triode 141 connected in its cathode circuit to ground through a suitable biasing network 142. Output signals from the triode 140, after being coupled through a capacitor 143, pass through a triode cathode follower 144, the output signals being transmitted through a capacitor 145 to the line 63.

To provide filtering of signals, a degenerative feedback circuit connected between the cathode of the triode 144 and the grid of the triode 141 comprises a parallel-T or twin-T frequency selective network adjustable to reject a desired frequency. With that arrangement, when the feedback network is adjusted to reject a particular frequency, all other frequencies are fed back to such an extent that the output of the filter consists essentially of only the frequency to which the parallel-T filter is tuned. In other words, the other frequencies have been attenuated by negative feedback to such a degree that the output signals are of a single frequency; i.e., the fundamental frequency of rotation of the machine under consideration. All spurious signals such as harmonics are rejected.

The frequency selective feedback network includes series connected variable resistors 146 and 147 having their common juncture shunted to ground selectively by one of four capacitors 148 switched by means of a range switch F1 incorporating ganged sections F1A and F1B. In parallel with the network including the variable resistors 146 and 147, and the capacitors 148, is a further network consisting of series connected capacitors 149 and 150 selectively connected in circuit by the switches F1A and F1B, respectively. Shunting the midtaps of those capacitors to ground is a variable resistor 151.

A suitable mechanical linkage 152 joints the variable resistors 146, 147 and 151 to enable the filter feedback network to be selectively adjusted to reject any desired frequency. Moreover, another linkage 153 gangs the switches F1, F1A and F1B to facilitate operation of the filter over a wide frequency range.

The input of the filter 62 is coupled by a further conductor 154 to a phase discriminator (FIGURE 5E), which forms a part of the filter and which receives comparison signals on a conductor 155, 90 degrees out of phase with those on the conductor 154. As will be described in detail below, the signals on the line 155 are obtained from the output of the filter 62 through a 90 degree phase shifting circuit such as an integrator.

Examining the discriminator, signals from the line 154 are coupled through resistors 156 and 157 to the grids of triode feedback amplifiers 158 and 159, respectively. Quadrature signals on the line 155 are applied to the grid of a triode feedback amplifier 160, also connected as a cathode follower, to couple in-phase signals through a capacitor 161 and variable resistor 162 to the grid of the amplifier 159, and to couple out-of-phase signals through a capacitor 163 and a resistor 164 to the grid of the amplifier 158. The combined signals from the amplifiers 158 and 159 are next transmitted through coupling networks 165 and 166 to two pairs of diodes 167 and 168, respectively. It will be apparent that the diodes are series connected with resistors 169 and 170 therebetween, and a midpoint 171 furnishing an output signal representative of variations of the incoming signals on the lines 154 and 155 from a quadrature relationship. A detailed description of this type phase discriminator may be found in the article entitled "Harmonic Insensitive Rectifiers for A-C Measurement," by R. L. Frank, Proceedings N.E.C., 1952.

A line 172 couples output signals from the phase discriminator to a zero center D.-C. vacuum tube voltmeter 173 which provides an indication of the phase differences between the input signals. In addition, the output or error signals are also coupled through a line 174 to the input of a servo system 175 incorporating conventional servo system elements including a servo amplifier and modulator. The servo circuits 175 drive, through output lines 176 to 179, a conventional servo motor 180 connected through a mechanical linkage 181 to the linkage 152 (FIGURE 5C) to adjust the variable resistors 146, 147 and 151 in the filter 62. Also joined to the servo motor 180 by the linkage 181 is a rate tachometer 182 feeding a rate signal through a line 183 to an input of the servo system 175.

In positions 1 and 2 of the selector switch S1B, the integrator 65 is coupled to the line 63 leading from the filter 62. Signals from the switch S1B are integrated by means of a conventional operational amplifier arrangement including a pentode 180, a pair of cathode coupled triode amplifiers 181, and one of four feedback capacitors 182 of different values selected by a range switch R1 when the selector switch S1C is in position 1, and one of four capacitors 183 selected by a level switch L1 when the selector switch S1C is in positions 2 and 3. As is well known, such operational amplifiers provide excellent integration of input signals. Of course, other known integrators could also be used and in that regard, other constant phase shift filters could be used as the filter 62.

With the selector switch S1D in position 1, integrated signals are supplied to the line 155 which, as described above, leads to the phase discriminator. Accordingly, the signals on the lines 154 and 155 are precisely ninenty degrees out of phase when the filter provides a constant 180 degree phase shift between input and output signals.

If the frequency of the input signals on the line 61 to the filter 62 increases, the phase of the output signals will be varied in one direction only, and if the input frequency, decreases, the phase of the output signals will shift in the other direction. It is essential that the foregoing relations apply or the filter circuit 62 and its associated circuits could not function as a constant phase shift filter. The foregoing will be more apparent after consulting FIGURE 6, wherein a representative phase curve of a twin-T network is illustrated. The term $\rho$ equals $f/f_o$, where $f$ is the input frequency and $f_o$ is the center frequency rejected by the twin-T feedback filter of FIGURE 5C.

Returning to the operation of the constant phase shift filter 62, the range switches F1, F1A and F1B, and the range switch R1, are positioned in accordance with the operating speed of the motor 10 undergoing tests. The phase discriminator then senses the amount of error between the normally quadrature signals on the lines 154 and 155 and causes the servo motor 180 to drive the variable resistors 146, 147 and 151 to reduce the error to zero. Accordingly, the phase between the filter input and output signals is held constant at 180 degrees.

Returning to FIGURE 5D, in positions 2 and 3 of the selector switch S1D, signals from the integrator 65 are coupled by the line 67 to the similar integrator 68 in which like elements are designated by like reference numerals. A level switch L2 ganged with the switch L1 inserts a selected one of the capacitors 183 in the feedback path. The output of the integrator 68 is transmitted through the line 69 to the A.C. vacuum tube voltmeter 70, as described above.

In order to determine the angular position of the unbalance forces, signals from the filter 62 (FIGURE 5C) are transmitted on the line 64 to the cross-over detector 66 (FIGURE 5E). A diode 184 shunts the input line 64 which transmits signals through one winding of a transformer 185 to the cathode of another diode 186 having its plate joined to the grid of a triode 187. The diode 184 compensates for the contact bias of the diode 186. The cathode of the triode 187 returns to ground through another winding of the transformer 185.

It will be apparent that a feedback path is established between the cathode of the triode 187 through the transformer 185 and the diode 186. An output from the cathode of the tube 187 is transmitted through a resistor 188, a further amplifier 189, and a coupling capacitor in an R-C network 190 to an output amplifier 191.

The output signals on the conductor 64 leading from the filter 62 are sine waves having a frequency determined by the operating speed of the motor 10. Such signals when applied to the zero cross-over detector 66 result in negative pulses on the cathode of the triode 187 as the sine wave passes through zero from its maximum to its minimum value, and positive pulses when the sine wave passes through zero when going from its minimum to maximum value. A detailed description of the theory of operation of the cross-over detector 66 may be found in the text "Waveforms," volume 19 of the Radiation of Laboratory Series, 1949, pages 343 to 346, and particularly FIGURES 9-22 and 9-23.

The negative pulses at the cathode of the triode 187 are inverted by the saturated amplifier 189 (positive pulses have no effect) and, after differentiation by the R-C network 190, cause conduction of the normally cut-off triode 191, thereby firing a gas strobe tube 192 through the line 71 and a capacitor 193. The tube 192 shuts off after a very short interval due to an R-C network 194 in its plate circuit. A high-low switch 195 is used to adjust the firing duration of the strobe 192, the switch being opened to shorten the firing duration when the operating frequency increases beyond a certain level.

Although the operation of the inventive balancing apparatus has been described above, and the functioning of the circuits of FIGURES 5A to 5E is apparent from the foregoing descrpition, it might be helpful to discuss briefly the balancing of the motor 10.

With the switches 88 in the position shown in FIGURE 5A, the potentiometers 84 are adjusted to compensate for any differences in response between the gauges 22 to 25. Moreover, if the switches remain in that position and the four switches 91 are positioned as shown, or the four switches 92 are actuated to their upper position, the output signals on the lines 59a and 59b (FIGURE 5B) will represent the total static unbalance forces of the rotor of the motor 10 including harmonics, not just unbalance at the fundamental frequency of rotation.

Moreover, if it is desired to obtain signals representative of the torques about the Z axis (FIGURE 3), it will be apparent from an examination of Equation 3 that the torque potentiometers 85 must be adjusted to multiply the signals in each of the four channels by $a$. Moreover, since two of the terms in Equation 3 are negative, the switches 91 in the upper two channels should be set to their plus position while the switches 92 in the two lower channels should be placed in their minus position. With that set up, the differential input of the operational amplifier will subtract the negative terms of Equation 3 from the positive terms and provide on line 59 signals representative of the total torques about the Z axis.

Although the torques about the X axis may not be as important as the torques $T_z$, it may sometimes be desirable to obtain signals representatives of those torques. Referring to Equation 4, there are two positive and two negative terms, each multiplied by the coefficient $c$. Therefore, the torque potentiometers 85 are set to multiply the signals by $c$, the switches 91 in the upper and lower channels are set to their plus position, and the switches 92 in the middle two channels are set to their minus position. With that arrangement, it is evident that the output signals on the line 59 will represent the total torques about the X axis.

To determine directly the unbalance amplitude in the right correction plane on the rotor of the motor 10, and the angular position of such unbalance, the selector switches S1 to S1D may first be set to position 1 to insert into circuit all of the above-described components with the exception of the second integrator 68 and meter 70. With that arrangement, and with the switches 88 positioned to place the torque potentiometers 85 in circuit and set as outlined above, the strobe 16 may be directed towards the disc 13 to provide an indication of the angular position of the unbalance in the right correction plane.

The selector switches S1 to S1D may then be moved to position 2 to bypass the variable amplifier 60 by a conductor 196. It is not necessary to retain the amplifier 60 in circuit because its chief function is to supply substantially constant amplitude signals to the filter 62 and its associated circuits, and particularly the phase discriminator which is sensitive to large amplitude variations in input signals.

With the selector switches in position 2, the signals are integrated twice by the integrators 65 and 68 and supplied to the A.-C. vacuum tube voltmeter 70. At this time the phase shift characteristics of the filter 62 are not of such great importance as when the angular position of the unbalance is being determined, and the degenerative feedback network therein may be manually adjusted to provide for maximum indications on the meter 70, and for a zero reading of the meter 173. As discussed above, the meter 70 may read in ounce-inches or gram-centimeters, and indicates the unbalance moment in the right correction plane rotating at the fundamental frequency of the motor 10.

After resetting the potentiometers 85, the same steps may be followed to obtain the angular position of the unbalance and its amplitude in the left hand correction plane.

The selector switches S1 to S1D may also be placed in position 3 to bypass, through a conductor 197, the variable gain amplifier 60 and the filter 62 to provide an output on the A.-C. vacuum tube voltmeter 70 representative of total unbalance, rather than unbalance at the fundamental frequency of operation of the motor 10.

It will be apparent from the foregoing that the present invention provides for highly accurate balancing of assembled rotating machines in any environment. It will be understood that the above-described embodiment of the invention is illustrative only and modifications thereof will occur to those skilled in the art. For example, the selector switches S1 to S1D may be omitted and outputs representative of the unbalance and their angular position in the correlation planes provided simultaneously by duplicating the necessary circuits. Therefore, the invention is not to be limited to the specific apparatus disclosed herein but is to be defined by the appended claims.

We claim:

1. Apparatus to balance a normally assembled and operative machine including a member rotating on an axis comprising four force gauges to support the machine and to generate signals only in response to and representative of vertical forces generated by rotation of the member two of the force gauges being associated with each end of the machine and laterally displaced from the axis in planes perpendicular to the axis, the force gauge planes being at known distances along the axis from first and second balancing planes at the ends of the machine, four signal conducting channels each connected to receive and modify the signals from a different one of the force gauges in accordance with said known distances, and means to combine the modified signals to provide output signals that are a function of unbalance torques generated by the rotating member.

2. Apparatus to balance a normally assembled and operative machine including a member rotating on an axis, comprising four force gauges to support the machine and to generate signals only in response to and representative of vertical forces generated by rotation of the member, two of the force gauges being associated with each end of the machine and laterally displaced from the axis in planes perpendicular to the axis, the force gauge planes being at known distances along the axis from first and second balancing planes at the ends of the machine, four signal conducting channels each connected to receive and modify signals from a different one of the force gauges in accordance with said known distances, means to add the modified signals from the two force gauges at each end of the machine to provide two composite signals, and means to add the composite signals to provide output signals that are a function of unbalance torques generated by the rotating member about an axis perpendicular to the axis of the member.

3. Apparatus as defined in claim 2, wherein a filter responsive to the output signals is provided to supply further output signals that are a function of unbalance torques about the axis perpendicular to the rotating member axis at the fundamental frequency of member rotation.

4. Apparatus to balance a normally assembled and operative machine including a member rotating on an axis, comprising four force gauges to support the machine, two force gauges being positioned at each end of the machine and laterally displaced from the axis in planes perpendicular to the axis and responsive to vertical forces to generate electrical signals representative of vertical forces generated by rotation of the member, the force gauge planes being at known distances along the axis from first and second balancing planes at the ends of the machine, four signal conducting channels each connected to a different one of the four force gauges and each including a frequency independent attenuator selectively modifying signals from the force gauge to which it is connected in accordance with said known distances, signal combining circuit means having two groups of inputs selectively coupled to the four channels, signals on the inputs of each group being added to provide composite signals, the signal combining circuit means being responsive to the composite signals to provide output signals which are the sum of the two composite signals, and means responsive to said output signals to provide indications of unbalance of the rotating member.

5. Apparatus as defined in claim 4, wherein said last-mentioned means responsive to said output signals indicates the angular position of unbalance forces generated by the rotating machine.

6. Apparatus to balance a normally assembled and operative machine including a rotating member comprising four force gauges to support the machine and to generate signals only in response to and representative of vertical forces generated by rotation of the member, the member rotating on an axis, balancing means on the rotating member at each end of the machine in first and second balancing planes, two of the force gauges being associated with each end of the machine and being positioned below the axis and laterally displaced therefrom in planes perpendicular to the axis, the force gauge planes being at known distances along the axis from the balancing planes, and means adjustable in accordance with said known distances and connected to the force gauges to be responsive to the force gauge signals to provide output signals indicative of the magnitude of unbalance forces of the rotating member in each balancing plane.

7. Apparatus as defined in claim 6, wherein said last-mentioned means is also responsive to said force gauge signals to provide indications of the angular position of the unbalance forces in each balancing plane.

8. Apparatus as recited in claim 6, wherein said adjustable means to provide output signals comprises means for modifying the signals from two force gauges at one end of the machine in accordance with the quantity $$\frac{d+a}{2d}$$

means for modifying the signals from the two force gauges at the other end of the machine in accordance with the quantity $$\frac{d-a}{2d}$$

wherein $d$ is the distance from the first and second balancing planes to the center of gravity of the member and $a$ is the distance from the force gauge planes to the center of gravity of the member, and means to combine the modified signals to provide output signals representative of the magnitude of the unbalance in one of the balancing planes, whereby the balancing means in said one balancing plane may be adjusted to minimize the unbalance.

9. Apparatus as recited in claim 6, wherein said adjustable means to provide output signals comprises means for modifying the signals from two force gauges at one end of the machine in accordance with the quantity $$\frac{D_1}{D_2}$$

means for modifying the signals from the two force gauges at the other end of the machine in accordance with the quantity $$\frac{D_3}{D_2}$$

wherein $D_1$ is the distance from the plane of said two force gauges at said one end of the machine to the balancing plane at said other end of the machine, $D_2$ is the distance between said first and second balancing planes, and $D_3$ is the distance from the plane of said two force gauges at said other end of said machine to said balancing plane at said other end of the machine, and means to combine the modified signals to provide output signals representative of the magnitude of the unbalance in said balancing plane at said one end of the machine, whereby the balancing means at said one end of the machine may be adjusted to minimize the unbalance.

10. Apparatus to balance a normally assembled and operative machine including a rotating member comprising four force gauges to support the machine and to generate signals only in response to and representative of vertical forces generated by rotation of the member, the member rotating on an axis, balancing means on the rotating member adjacent to each end of the machine and located in first and second balancing planes, two of the force gauges being disposed below the rotating axis and displaced laterally therefrom on each side of the axis, the force gauges being at known distances along the axis from the balancing planes, four signal conducting channels each of which is connected to receive and conduct signals from a different one of the force gauges, signal modifying means in each channel individually adjustable to modify the signals in accordance with said known distances between the force gauges and the balancing planes, and means to combine the modified signals to provide output signals representative of the magnitude of the unbalance forces in one of the balancing planes, whereby the balancing means in said one balancing plane may be modified to minimize the unbalance forces.

11. Apparatus as defined in claim 10, wherein a filter responsive to the output signals is provided to supply signals representative of unbalance at the fundamental frequency of member rotation.

12. Apparatus as defined in claim 11, wherein strobe light means responsive to the fundamental frequency signals flashes in synchronism therewith, and indexing means juxtaposed with the balancing means in the one balancing plane to indicate when illuminated by the flashing strobe light the angular position of the fundamental frequency unbalance.

13. Apparatus to balance a normally assembled and operative machine including a rotating member comprising four force gauges to support the machine and to generate signals only in response to and representative of vertical forces generated by rotation of the member, the member rotating on an axis, balancing means on the rotating member adjacent to each end of the machine and located in first and second balancing planes at known distances from the center of gravity of said member, two of the force gauges being disposed below the rotation axis and displaced laterally therefrom on each side of the axis at each end of the machine, the force gauges being at known distances along the axis from the balancing planes, four signal conducting channels each of which is connected to receive and conduct signals from a different one of the force gauges, signal modifying means in each channel individually adjustable to modify the signals, the signal modifying means in the first pair of channels connected to the two gauges at one end of the machine being adjustable to modify the signals therefrom in accordance with one of two constants determined by the known distances between the force gauges and balancing planes, the signal modifying means in the second pair of channels connected to the two gauges at the other end of the machine being adjustable to modify the signals therefrom in accordance with the other constant, means to combine the modified signals to provide output signals representative of the magnitude of the unbalance in one of the balancing planes, whereby the balancing means of said one balancing plane may be adjusted to minimize the unbalance, means to change the adjustments of the signal modifying means in the first and second pairs of channels to interchange the two modifying constants from one pair of channels to the other pair of channels, and means to combine the further modified signals to provide further output signals representative of the magnitude of the unbalance in the other of the balancing planes, whereby the balancing means of said other balancing plane may be adjusted to minimize the unbalance.

14. Apparatus as defined in claim 13, wherein a filter responsive to the output signals is provided to supply signals representative of unbalance at the fundamental frequency of member rotation.

15. Apparatus as defined in claim 14, wherein strobe light means responsive to the fundamental frequency signals flashes in synchronism therewith, and indexing means juxtaposed with each of the balancing means to indicate when illuminated by the flashing strobe light the angular position of the fundamental frequency unbalance.

16. Apparatus to balance a normally assembled and operative machine including a rotating member comprising four force gauges to support the machine and to generate signals only in response to and representative of vertical forces generated by rotation of the member, the member rotating on an axis, balancing means on the rotating member adjacent to each end of the machine and located in first and second balancing planes at a distance $d$ from the center of gravity of the member, two of the force gauges being disposed below the rotation axis and displaced laterally therefrom on opposite sides of the axis in a plane perpendicular thereto at each end of the machine at a distance $a$ from the center of gravity, four signal conducting channels each of which is connected to receive and conduct signals from a different one of the force gauges, signal modifying means in each channel and individually adjustable to modify the signals, the signal modifying means in the first pair of channels connected to the two force gauges at one end of the machine being adjustable to modify the signals therefrom in accordance with the quantity $$\frac{d+a}{2d}$$

the signal modifying means in the second pair of channels connected to the two gauges at the other end of the machine being adjustable to modify the signals by the quantity $$\frac{d-a}{2d}$$

means to combine the modified signals to provide output signals representative of the magnitude of the unbalance in one of the balancing planes, whereby the balancing means in said one balancing plane may be adjusted to minimize the unbalance, means to change the adjustments of the signal modifying means in the first and second pairs of channels to interchange the two modifying quantities from one pair of channels to the other pair of channels, and means to combine the further modified signals to provide output signals representative of the magnitude of the unbalance in the other of the balancing planes, whereby the balancing means in said other balancing plane may be adjusted to minimize the unbalance.

17. Apparatus as defined in claim 16, wherein a filter responsive to the output signals is provided to supply signals representative of unbalance at the fundamental frequency of member rotation.

18. Apparatus as defined in claim 17, wherein strobe light means responsive to the fundamental frequency signals flashes in synchronism therewith, and indexing means juxtaposed with each of the balancing means to indicate when illuminated by the flashing strobe light the angular position of the fundamental frequency unbalance.

References Cited in the file of this patent

UNITED STATES PATENTS

| Re.23,785 | Weaver et al. | Feb. 16, 1954 |
| 2,451,863 | Oakley | Oct. 19, 1948 |
| 2,461,645 | Kallmann | Feb. 15, 1949 |
| 2,534,918 | Kroft et al. | Dec. 19, 1950 |
| 2,730,899 | Hellar et al. | Jan. 17, 1956 |
| 2,731,834 | Fehr et al. | Jan. 24, 1956 |
| 2,740,297 | Phelps | Apr. 3, 1956 |
| 2,783,648 | Stovall et al. | Mar. 5, 1957 |
| 2,815,666 | Pischel | Dec. 10, 1957 |
| 2,848,897 | Rambo | Aug. 26, 1958 |

FOREIGN PATENTS

| 399,845 | Great Britain | Oct. 13, 1933 |
| 962,474 | Germany | Apr. 25, 1957 |